April 15, 1924.
J. A. STEFFENS
PROCESS OF DRYING ALCOHOL
Filed Jan. 8, 1923
1,490,520
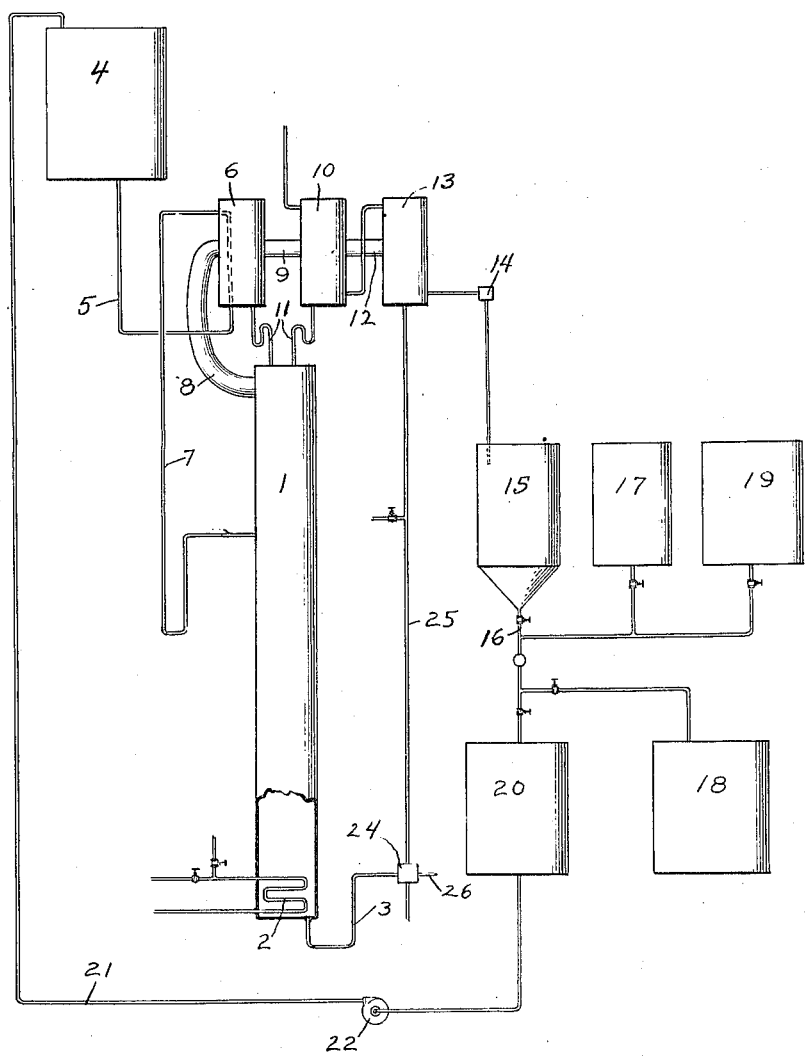
Inventor
John A. Steffens
by
W.P. McElroy
Attorney
By Patented Apr. 15, 1924.

1,490,520

UNITED STATES PATENT OFFICE.

JOHN A. STEFFENS, OF BROOKLYN, NEW YORK.

PROCESS OF DRYING ALCOHOL.

Application filed January 8, 1923. Serial No. 611,497.

*To all whom it may concern:*

Be it known that I, JOHN A. STEFFENS, a citizen of the United States, residing at Brooklyn, in the county of Kings and State of New York, have invented certain new and useful Improvements in Processes of Drying Alcohol, of which the following is a specification.

This invention relates to processes of drying alcohol; and it comprises a method of reducing the water content of alcohol wherein such alcohol is admixed with an amount of benzol, or its equivalent, in excess of 9.5 times and usually corresponding to about 9 to 10.5 times the weight of water present; the benzol and alcohol being then distilled together in a suitable fractionating device of the nature of a column still; all as more fully hereinafter set forth and as claimed.

As is well known, ethyl alcohol (grain alcohol) containing water cannot be brought to a strength beyond about 95 per cent by simple distillation whatever the efficiency of the distilling means. It is easily possible to produce alcohol of about 95 per cent by many types of column still; but beyond this the operator cannot go. An alcohol of about 95 per cent strength has a lower boiling point than either stronger or weaker alcohol; and spirit of this strength therefore goes to the head of the still and thence to the condenser.

There is however a considerable commercial demand for "absolute" alcohol; or alcohol stronger than 95 per cent. In particular it is desired for making composite motor fuels; blended fuels of which alcohol is one component and kerosene or some other petroleum oil is another. Apart from the undesirability of water in the fuel, 95 per cent alcohol does not blend well with most petroleum oils and in general the presence of a blending agent (benzol, ether, etc.) is necessary. The drier the alcohol, the less the necessity for a blending agent.

The commercial demand for absolute alcohol is in part met by modifications of the ordinary laboratory methods in which alochol is distilled to 95 per cent and then dried by hydroscopic chemicals: lime, calcium chlorid, potassium carbonate, sodium, calcium carbid, etc. In part it is met by modifications of the so-called "Young's method," wherein water is distilled out of strong alcohol by the addition of a third volatile body, generally benzol. With a mixture containing alcohol, water and benzol, on distillation the water and benzol together boil (for various physical reasons) at a lower temperature than the alcohol and therefore go to the head of the column while anhydrous alcohol can be drawn off at the base. It is to this latter type of process that the present invention pertains.

In this manner of drying alcohol, not all the alcohol supplied to the still is drawn off at the base; some inevitably distills over with the benzol and water. The vapors coming from the head of the stills on condensation yield two strata: an upper or overlying stratum of benzol containing a little water and a little alcohol and an underlying layer of water and alcohol containing some benzol kept in solution by the alcohol. It is customary to dilute this lower layer to separate the dissolved benzol and then re-rectify the diluted liquid to obtain 95 per cent alcohol which can re-enter the operation. Obviously, the greater the proportion which dry alcohol obtained at the base of the still bears to the alcohol which goes over with the vapors and which must be reconcentrated, the greater the economy of the operation. By the most approved methods now in use it is difficult however in practical operation to obtain more than 40 to 60 per cent of the alcohol directly as dry alcohol; 60 to 40 per cent going over with the benzol and water and requiring redistillation and reconcentration.

The yields stated are theoretically far below those which are possible and the difficulty in improving them lies in the relatively complex nature of the operation, and the nice regulation of conditions necessary to ensure that neither benzol (which has about the same boiling point as alcohol) nor water passes out with the dried alcohol at the base of a still. The difficulties of operation are accentuated in methods of operation where the benzol as it separates from the condensate is fed directly back to the still. Under these conditions, with any slight change in the composition or proportion of the alcohol feed, either benzol or water tends to creep downward in the column and reach the absolute-alcohol discharge.

I have found that by improvements in certain details of procedure, I can much improve the operation of processes of this type, reaching a yield of 80 to 85 per cent of the alcohol charged in a single pass instead of the usual 40 to 60 per cent. In my improved way of conducting the operation instead of separately feeding the still with alcohol (either as liquid or as vapors) and with benzol, I first make a definite mixture of alcohol and benzol and supply this to the still. I feed the still with only one material instead of two. I find that a mixture of alcohol, water and benzol containing about 10 parts of benzol for each part of water if so supplied to a column still at a point about a third of the way from the top, gives perfectly definite, reproducible results with a yield of around 80 to 85 per cent of the alcohol charged in the form of absolute alcohol, leaving about 20 per cent to be redistilled. Using such a mixture, there is no difficulty in stopping or starting the still; neither is there any trouble due to benzol or water in the alcohol discharged.

In this operation, the permissible range or limits of variation are between about 9.5 parts of benzol and 10.5 parts for each part of water present. With a ratio less than 9.5, the alcohol is not completely dehydrated; with a ratio greater than 10.5, benzol may creep into the absolute alcohol; or if this be prevented by the use of more heating steam, the efficiency diminishes. A ratio of 10:1 is satisfactory with most column stills and with a good grade of alcohol. While I may use amounts of benzol somewhat in excess of the 10.5 ratio, I do not regard it as economical as amounts around 10.5.

While I have stated the use of benzol, I have found that in practice I am not restricted to the use of benzol in this operation, since I can use other hydrocarbons, such as the petroleum hydrocarbons. Most of the petroleum hydrocarbons are not themselves miscible with 95 per cent alcohol, but they are miscible when used in connection with benzol. With mixtures of hydrocarbons of different sorts, evidence of the formation of quarternary boiling mixtures may be observed; but for practical purposes I find that a mixture of benzol with a saturated hydrocarbon from gasoline of about the same boiling point as benzol behaves in the present process practically like benzol. Low boiling hydrocarbons from gasoline made with the aid of aluminum chlorid may be used. Various cyclic or "ring" hydrocarbons, such as cyclohexane or hydrogenated benzenes may be used in connection with the benzol. Whatever other hydrocarbons are used in admixture with benzol, the foregoing ratios apply.

The solubility of alcohol in other hydrocarbons being in general less than in benzol, in using these admixtures, the composition of the two-phase condensate varies somewhat with the composition of the hydrocarbon mixture used in distillation. In a general way the total amount of alcohol going to the condenser is the same whatever the composition of the hydrocarbon used, provided it boils at or near the boiling point of benzol, say around 78–80°; but the greater the proportion of benzol, the more of this alcohol is in the hydrocarbon layer and the less in the underlying aqueous layer and vice versa. With benzol, the upper layer contains both alcohol and water in about the 95:5 ratio. Allowance is made for this contained water in returning the benzol for readmixture with alcohol. Using other (and less alcohol-soluble) hydrocarbons with the benzol, the upper layer contains less alcohol and less water and the lower layer less hydrocarbon. The less hydrocarbon in the lower layer, the less dilution is necessary prior to redistilling it to obtain strong alcohol.

I regard my invention as covering the use of petroleum hydrocarbons of low boiling point in connection with benzol.

In the accompanying illustration I have shown, more or less diagrammatically, certain combinations of apparatus elements susceptible of use in the described process.

In this showing, the view is in elevation, certain parts being shown in vertical section.

Element 1 is a column still of any usual or accepted internal structure. At its base it may be provided with heating elements diagrammatically shown as coil 2 and with trapped outlet 3 for dry alcohol. Stock tank 4 supplies liquid to be distilled to the column. From the stock tank, the liquid passes through pipe 5 to and through the diagrammatically shown preheater 6 whence it goes by pipe 7 to a point of inlet about a third of the way from the top of the column. Vapors leave the head of the still through vapor conduit 8 passing through the preheater just mentioned and thence by conduit 9 to dephlegmator 10. Both the preheater and the dephlegmator have trapped communication through conduits 11 with the head of the still. The vapors pass from the dephlegmator by conduit 12 to diagrammatically shown condenser 13 provided with sight box 14. The condensate passes into separating tank 15 where the condensate separates into an overlying layer of benzol and an underlying layer of water and alcohol. From time to time, the liquids are tapped off and sent through conduit 16 to appropriate stock tanks 17 and 18, the former being for storage of benzol and the latter for that of weak alcohol. This weak alcohol may be diluted to separate benzol, etc., and then redistilled to obtain strong alcohol suitable for use in the process; or it may be otherwise treated. Stock tank 19 serves for storage of 95 per cent alcohol or other alcohol to be concentrated. Tank 20 is a mixing tank in which benzol from 17 and alcohol from 19 are mixed in such proportions as to give the ratio of benzol to water stated, namely about 10 parts of benzol to every part of water present. The mixture made in tank 20 is sent by means of conduit 21 and pump 22 to the previously mentioned stock tank (4) for feeding the column still. Dry alcohol from the base of the column goes through cooler 24 supplied with cooling water from pipe 25 which also serves to feed the condenser. The dry alcohol is sent to a place of use or storage through pipe 26.

By the expression "low boiling hydrocarbons" in the appended claims, I mean hydrocarbons immiscible wih water and boiling at about the boiling point of pure benzol (80.4). Commercial benzol or benzene of a good grade generally boils within a degree or so of the boiling point of chemically pure benzol. The parts referred to are parts by weight.

The weak alcohol in tank 18, instead of being further diluted and then distilled, may be treated in other ways. One such way which is advantageous, is to supply it to a column still, such as still 1 of the illustration, at an intermediate point in its height. In so doing, with appropriate control of heat and other conditions, a constant boiling mixture of benzol, alcohol and some water passes off at the head of the column still. The condensate stratifies. It may go directly, in using the apparatus of the drawing, to stock tank 15. In using column still 1 of the drawing for this treatment of the weak spirituous condensate, water now passes off at 26. If desired, strong alcohol can be tapped off column still 1, in using this method of treating the weak condensate, by an outlet (not shown) taking liquid from the plates of the still at points immediately above the entry of pipe 7. Such alcohol, if so tapped off, may be sent to stock tank 19. This alcohol will contain a little benzol, but this fact is immaterial. As stated, in the present method of operation, there is no difficulty in stopping or starting a still, since the still charge is all liquid; and this fact permits the use of still 1 and connections shown for disposing of the weak spirituous condensate from time to time as it accumulates.

Other methods of treating this weak spirituous condensate may be adopted, but these in general require other apparatus than that shown. For example, the spirituous liquid may be treated in a still with a little open steam to blow out the benzol (and some alcohol) and the residual liquid than rectified as usual in a column still to produce 95 per cent alcohol and water. It is a useful expedient in using the column still of the figure for treating the weak spirituous condensate, to introduce a little water or steam into the still at a point somewhat below the connection of the pipe 7 shown.

What I claim is:

1. In the manufacture of absolute ethyl alcohol by fractional distillation of a mixture of alcohol, water and low boiling hydrocarbon in a column still, the process which comprises continuously supplying said still with a mixture of the three substances wherein the ratio of low boiling hydrocarbons to water is as 10:1.

2. In the manufacture of absolute ethyl alcohol by fractional distillation of a mixture of alcohol, water and low boiling hydrocarbons in a column still, the process which comprises continuously supplying said still with a mixture of the three substances wherein the ratio of low boiling hydrocarbons to water is between the ratios 9.5:1 and 10.5:1.

3. A process such as described in claim 1 wherein the low boiling hydrocarbon comprises a mixture of benzol and a petroleum hydrocarbon.

4. In the manufacture of absolute ethyl alcohol by fractional distillation of a liquid mixture of alcohol, water and low boiling hydrocarbons in a column still, the process which comprises continuously supplying said still with a boiling mixture of the three substances wherein the ratio of low boiling hydrocarbons to water is as 10:1, abstracting absolute alcohol from the base of the still and condensing the vapors of benzol, water and alcohol coming from the head of the still, removing the stratified layer of benzol for producing such liquid mixture and rectifying the remaining aqueous liquid to produce benzol for use in making such liquid mixture, strong alcohol for use in such mixture and a residue of water.

5. In the manufacture of absolute ethyl alcohol by fractional distillation of a mixture of alcohol, water and low boiling hydrocarbons in a column still, the process which comprises continuously supplying said still with a mixture of the three substances wherein the ratio of low boiling hydrocarbons to water is in excess of the ratio 9.5:1.

In testimony whereof, I have hereunto affixed my signature.

JOHN A. STEFFENS.